United States Patent [19]

Ban

[11] Patent Number: 4,520,688
[45] Date of Patent: Jun. 4, 1985

[54] VARIABLE CAPACITY FLYWHEEL
[75] Inventor: Masaki Ban, Tokyo, Japan
[73] Assignee: Honda Giken Kogyo Kabushiki Kaisha, Tokyo, Japan
[21] Appl. No.: 652,156
[22] Filed: Sep. 18, 1984

Related U.S. Application Data

[63] Continuation of Ser. No. 447,574, Dec. 7, 1982, abandoned.

[30] Foreign Application Priority Data

Dec. 19, 1981 [JP] Japan .............................. 56-204512

[51] Int. Cl.³ .............................................. G05G 1/00
[52] U.S. Cl. ..................... 74/572; 74/573 R
[58] Field of Search .............................. 74/572, 573 R

[56] References Cited
U.S. PATENT DOCUMENTS 3,242,765 3/1966 Zahn ..................................... 74/572
3,280,653 10/1966 Mooney et al. ....................... 74/572
4,262,552 4/1981 Honda ................................... 74/572

Primary Examiner—James A. Leppink
Assistant Examiner—Frank H. McKenzie, Jr.
Attorney, Agent, or Firm—Sughrue, Mion, Zinn, Macpeak and Seas

[57] ABSTRACT

A variable capacity flywheel comprises a main flywheel coupled with the rotating shaft of an engine and at least one rotatable auxiliary flywheel. Both are selectively engaged and disengaged with one another by means of an electromagnetic clutch. Both flywheels are engaged with one another by an energizing member in the low speed range of said engine. Both are disengaged from one another by means of excitation control of the electromagnetic clutch in the high speed range of the engine. A generator driven by the engine rotating shaft is connected in series with the electromagnetic clutch and a battery.

1 Claim, 4 Drawing Figures

4,520,688

VARIABLE CAPACITY FLYWHEEL

This is a continuation of application Ser. No. 447,574 filed Dec. 7, 1982, now abandoned.

BACKGROUND OF THE INVENTION

This invention relates to a variable capacity flywheel to be mounted to the rotary system of an internal combustion engine used, for example, in motorcycles, automobiles, etc. In internal combustion engines, flywheels have been used to restrict within a predetermined value the variations of angular velocity which occur during operation due to changes in torque. The momentum of a body of revolution may be expressed as $E = I\omega_m$, that is, as the product of the moment of inertia I of the body of revolution and an average angular velocity $\omega_m$. Since the momentum of a body of revolution increases with increasing rotational speed, an internal combustion engine needs a flywheel having a large moment of inertia I in the range of low engine speed, but it needs a flywheel having a comparatively small inertia of moment in the range of high engine speed. Additionally, from the standpoint of accelerating and decelerating ability at high engine speeds, it is preferable for the moment of inertia I to be small. To meet these diverse requirements, variable capacity flywheels have been developed.

A variable capacity flywheel in a conventional system uses an auxiliary flywheel connected to a flywheel directly coupled with a crank shaft through a centrifugal clutch. In these systems, a significant amount of slippage exists between both flywheels in engaging or disengaging the clutch at the boundaries of specified engine speeds. This results in a great loss of power in the system.

Furthermore, a variable capacity flywheel in a conventional system uses a main flywheel engaged with an auxiliary flywheel by energizing an electromagnetic clutch. This requires a large capacity battery or generator to actuate the electromagnetic clutch in the range of low engine speed. Such devices are therefore unsuitable for vehicles of a small total stroke volume or for those which require quick acceleration and responsive handling.

SUMMARY OF THE INVENTION

This invention relates to improvements in a variable capacity flywheel to overcome the drawbacks of prior art devices.

This invention provides a lightweight and inexpensive device for stabilizing engine operation over a range of operating conditions.

In accordance with this invention, a variable capacity flywheel is defined having a main flywheel coupled to the engine shaft and at least one rotatable auxiliary flywheel. The flywheels are selectively engaged and disengaged with each other by means of an electromagnetic clutch. Both flywheels are engaged with each other at low engine speed ranges by an energizing member and are disengaged from each other by means of excitation control of the electromagnetic clutch in the engine high speed range. This invention will be described in greater detail relative to the drawing and the description of the preferred embodiment that follows.

DESCRIPTION OF THE PREFERRED EMBODIMENT

Figure 1:
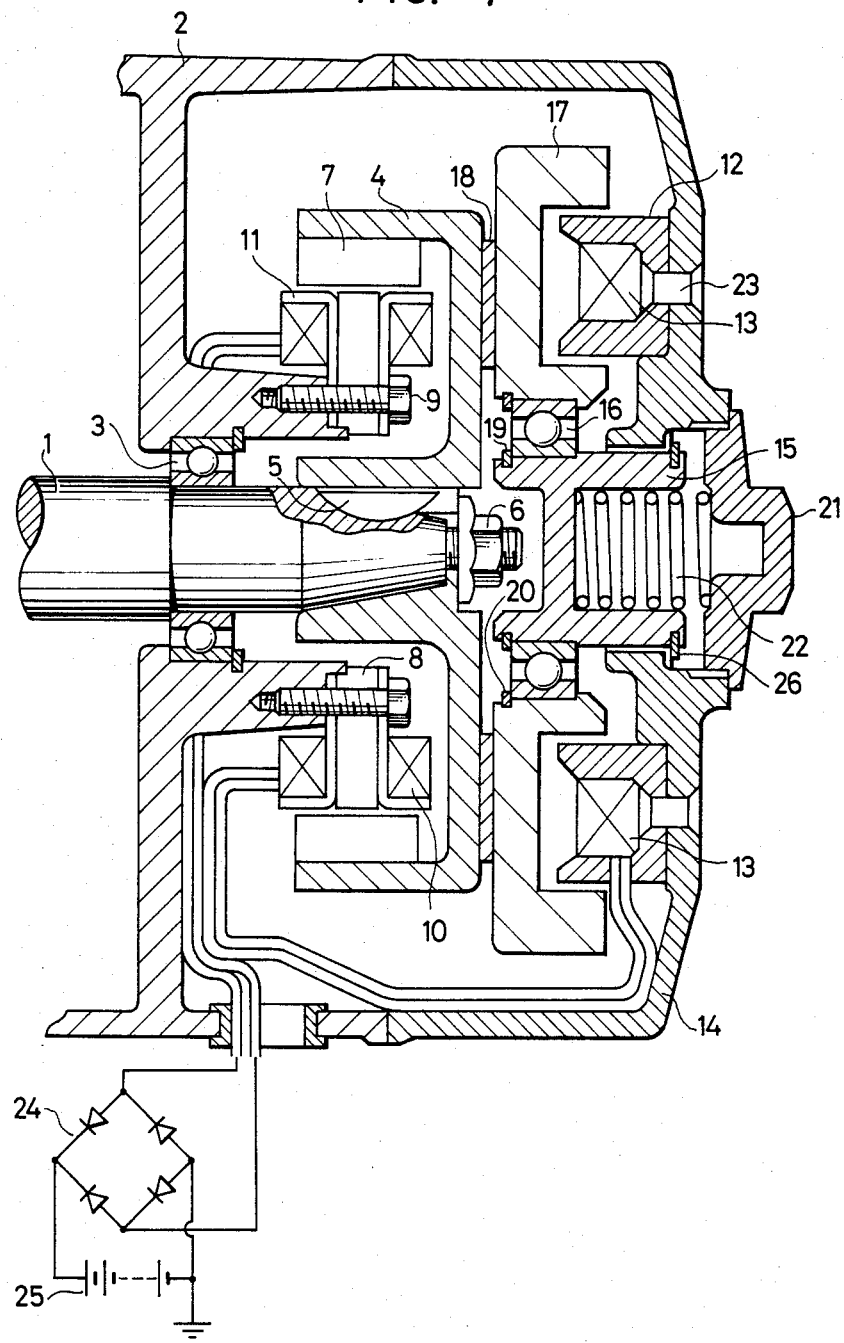
FIG. 1 is a sectional elevational view of a variable capacity flywheel according to this invention.

A first embodiment of this invention as shown in FIG. 1 will now be described. The crankshaft 1 of a gasoline engine (not shown) for motor vehicles, such as a motorcycle, is rotatably supported on a crankcase 2 through a bearing 3. A main flywheel 4 which serves also as the rotor of an a.c. generator is integrally mounted on said crank shaft 1 by means of a key 5 and a nut 6. A permanent magnet 7 is integrally installed on the inside periphery of the main flywheel 4.

Furthermore, an a.c. generator stator core 8 is integrally mounted on the crank case 2 with bolts 9 at a place closer to the center of the crankshaft 1 than said permanent magnet 7. An a.c. generator clutch coil 10 and an a.c. generator charging coil 11 are respectively fitted to the stator core 8. The a.c. generator clutch coil 10 is electrically connected with the clutch field coil 13 in a clutch field core 12. The a.c. generator charging coil 11 is electrically connected with a car battery 25 through a rectifier circuit 24.

A flywheel cover 14 is detachably mounted on the crankcase 2 to seal the outside periphery of the main flywheel 4. A slide bearing holder 15 is mounted at the center portion of the flywheel cover 14 to be slidable along the extension of the center line of the crankshaft 1 by means of a spline. An auxiliary flywheel 17 is rotatably mounted on the bearing holder 15 through a ball bearing 16. A clutch facing 18 is bonded to the surface of the auxiliary flywheel 17. The auxiliary flywheel is made of a ferrous material. Relative axial movement between the bearing holder 15 and the ball bearing 16 is prevented by a cir-clip 19, and correspondingly relative movement between the ball bearing 16 and the auxiliary flywheel 17 is limited by a cir-clip 20. A spring retaining nut 21 is screwed to the flywheel cover 14 at a position outside of said bearing holder 15. A compression coil spring 22 is provided between the bearing holder 15 and the flywheel cover 14. Under normal conditions, the auxiliary flywheel 17 is pressed against the main flywheel 4 interposing the clutch facing 18 therebetween by the action of the compression coil spring 22.

Additionally, the clutch field core 12 is mounted opposing the outside of the auxiliary flywheel 17 with rivets 23. The clutch field coil 13 is integrally mounted in the clutch field core 12. By energizing the field coil 13, the auxiliary flywheel 17 is attracted by the field coil 13 against the spring force of the compression coil spring 22. At a proper energization level, the auxiliary flywheel is released from the main flywheel 4 overcoming the bias provided by the spring force. A cir-clip 26 is mounted on the bearing holder 15 to restrict the movement of the holder.

Figure 2:
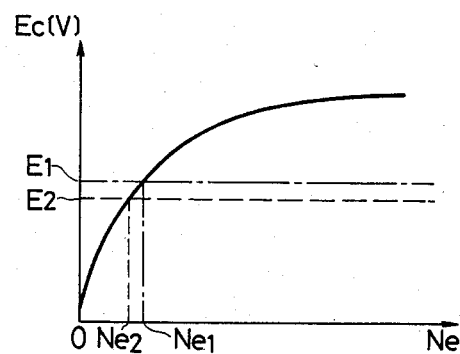
FIG. 2 is a graph of characteristic curves showing the relationship between the number of revolutions and voltage for the embodiment of FIG. 1.

With the construction of the embodiment of the invention as shown in FIG. 1, when the engine is stopped, the main flywheel serves as the rotor of an a.c. generator which is also at rest. Hence, the auxiliary flywheel 17 is maintained in engagement with the main flywheel 4 by the spring force of the compression coil spring 22. Furthermore, as shown in FIG. 2, when the number of revolutions $N_e$ of the crankshaft 1 is below the clutch engagement number of revolutions $N_{e1}$ after start of engine, the output $E_c$ of the a.c. generator clutch coil 10 is below the minimum voltage $E_1$ for clutch attraction. Hence, the clutch is kept in engagement. Thus, the auxiliary flywheel is rotated together with the main flywheel 4 and the moment of inertia 1 of engine increases by the amount of the auxiliary flywheel 17. Consequently, smooth operation of engine without unevenness in engine speed even in the range of low engine speed is obtained. Where the number of revolutions $N_e$ of the crankshaft 1 approaches the clutch engagement number of revolutions $N_{e1}$, the a.c. generator clutch coil output $E_c$ becomes approximately equal to the clutch attraction minimum voltage $E_1$. Consequently, the clutch is maintained in a "half clutch" condition, that is, auxiliary flywheel 17 rotates slipping relatively with respect to the main flywheel 4.

When the number of revolutions $N_e$ of the crankshaft 1 exceeds the clutch engagement number of revolutions $N_{e1}$, the a.c. generator clutch coil output $E_c$ exceeds the clutch attraction minimum voltage $E_1$. The clutch is completely disengaged. Accordingly, the auxiliary flywheel 17 continues to rotate due to its inertia without receiving any turning moment from the main flywheel 4 and the moment of inertia I of engine decreases by the amount of that of the auxiliary flywheel 17. This in turn results in an increase in the accelerating and decelerating ability of engine.

In addition, when the number of revolutions $N_e$ of the crankshaft 1 decreases under conditions where $N_e$ has exceeded the clutch engagement number of revolutions $N_{e1}$ the clutch is kept in disengagement until $N_e$ drops below the clutch connection number of revolutions $N_{e2}$ which is lower than the clutch engagement number of revolutions $N_{e1}$. When the number of revolutions $N_e$ of the crankshaft 1 is equal to the clutch release number of revolutions $N_{e2}$, the a.c. generator clutch coil output $E_c$ approaches the clutch connection maximum voltage $E_2$. The clutch is kept in a "half clutch" condition. When the number of revolutions $N_e$ of the crankshaft 1 reaches a value much lower than the clutch release number of revolutions $N_{e2}$, the a.c. generator clutch coil output $E_c$ decreases to a value lower than the clutch connection maximum voltage $E_2$. The auxiliary flywheel 17 receives negligible electromagnetic force from the clutch field coil 13 but primarily is biased by the spring force of the compression coil spring 22. The clutch under these conditions being connected, the auxiliary flywheel 17 is rotated together with the main flywheel 4.

As mentioned above, in the embodiment shown in FIG. 1, the auxiliary flywheel 17 is integrally coupled with the main flywheel 4 in the range of low engine speed where a large moment of inertia I is required. The auxiliary flywheel 17 is released from the main flywheel 4 in the range of high engine speed where a large moment of inertia I is not required so that both operation of engine without speed unevenness in the low engine speed range and an increase in accelerating and decelerating ability in the high engine speed range may be achieved.

In addition, in the low engine speed range where engine output is low, the auxiliary flywheel 17 is coupled with the main flywheel 4 by the spring force of the compression coil spring 22 without requiring a supply of significant power to the clutch field coil 13. Conversely, in the high engine speed range where engine output is high, the auxiliary flywheel 17 is released from the main flywheel 4 by exciting the clutch field coil 13 using an electric power generated in the a.c. generator clutch coil 10 utilizing a part of the engine output. Accordingly, the necessity for a separate battery to be used in engaging and disengaging the clutch may be eliminated, resulting in a significant reduction of weight.

Furthermore, no complicated control circuit is required for the engagement and disengagement of the main flywheel 4 and the auxiliary flywheel 17 since the a.c. generator clutch coil 10 driven by the engine is connected in series directly to the clutch field coil 13.

Figure 3:
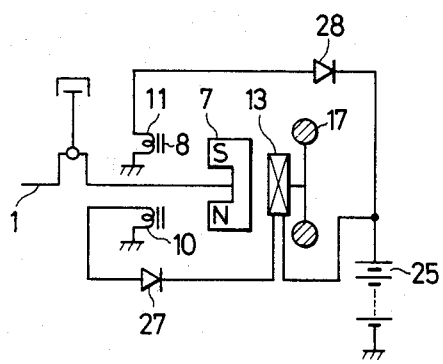
FIG. 3 is a schematic diagram of a second embodiment of this invention.

Although, in the embodiment shown in FIG. 1, the a.c. generator clutch coil 10 is connected in series directly to the clutch field coil 13, diodes 27, 28 may be interposed between the a.c. generator clutch coil 10 and the clutch field coil 13 and between the a.c. generator charging coil 11 and the car battery 25, respectively. Moreover, the other end of the clutch field coil 13 may be connected to the + terminal of the car battery 25 as shown in FIG. 3. In the circuit thus formed, an additional electric potential may be added to the car battery, so that the combination of a large capacity electromagnetic clutch and a small capacity of generator may make it possible to set the clutch engagement number of revolutions at a higher value in comparison with the aforementioned embodiment. This is graphically shown in FIG. 4.

Figure 4:
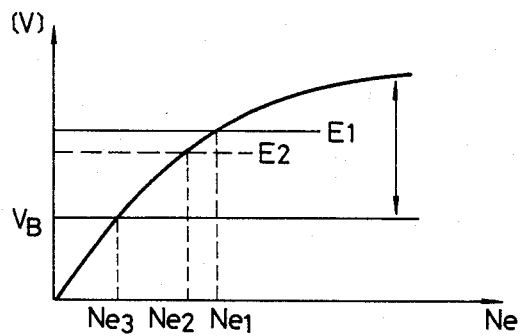
FIG. 4 is a characteristic curve showing the relationship between the number of revolutions and voltage for the embodiment of FIG. 3.

The symbols $N_{e1}$, $N_{e2}$, $E_1$ and $E_2$ in FIG. 4 represent the same values as those for the embodiment of FIG. 1, and $V_B$ designates the terminal voltage of car battery 25.

In addition, this invention may be applied to a vehicle electrical system using a.c. only which uses no battery. Furthermore, although the main flywheel and auxiliary flywheel are engaged with one another by a compression coil spring in aforementioned embodiments, magnets may be used as energizing member.

In the variable capacity flywheel according to this invention a main flywheel is mounted on the rotating shaft of an engine and at least one rotatable auxiliary flywheel is selectively engaged and disengaged with one another by means of an electromagnetic clutch. They are adapted to be engaged with one another by means of an energizing member in the range of low engine speed, and to be disengaged by means of excitation control of said electromagnetic clutch in the range of high engine speed. Accordingly, the rotary members of the engine may be rotated at a moment of inertia most suited to the operating condition of the engine and the engine may be operated smoothly in the low engine speed range and with a superior accelerating and decelerating ability in the high engine speed range.

In addition, in accordance with this invention, it is possible to actuate the electromagnetic clutch making use of engine power in the high engine speed range so that no increased battery capacity or increased generator capacity is required. As a result, the increase in overall engine weight due to addition of a variable capacity flywheel may be avoided.

Although the embodiments of this invention shown in the drawings have been described in detsail, this invention is not limited to these embodiments, but it it possible to modify the design where necessary within the spirit and scope of this invention.

What is claimed is:

1. A variable capacity flywheel for an engine comprising:

a main flywheel coupled to an output shaft of said engine;

a permanent magnet mounted on said main flywheel wherein said main flywheel defines a generator rotor, a generator stator core and a clutch coil fixedly mounted on a housing in an operative arrangement with said permanent magnet wherein the a.c. output of said clutch coil increases as the speed of said engine increases;

means coupled to said main flywheel for generating an electrical signal;

at least one rotatable auxiliary flywheel mounted for rotation on an axis coincident with the axis of said output shaft;

a clutch facing mounted on the surface of said auxiliary flywheel confronting said main flywheel;

means to bias said auxiliary flywheel in engagement with said main flywheel, said biasing means comprising a compression spring aligned on said axis and constrained by a bearing holder for said auxiliary flywheel;

electromagnetic clutch emans energized by said electrical signal for selectively engaging and disengaging said main and auxiliary flywheels wherein at low engine speeds the excitation of said electromagnetic clutch is insufficient to overcome the force provided by said means to bias and at high speed ranges of the engine the excitation of said electromagnetic clutch provides a force overcoming the bias force and disengages said auxiliary flywheel from said main flywheel, wherein said electromagnetic clutch means comprises a clutch field core carrying a clutch field coil fixedly mounted relative to said auxiliary flywheel, said clutch coil connected in series to said clutch field coil for energization of said electromagnetic clutch means as a function of output shaft rotation.

* * * * *